(No Model.)
H. F. BEIMLING.
CENTRIFUGAL LIQUID SEPARATOR.
No. 427,390. Patented May 6, 1890.
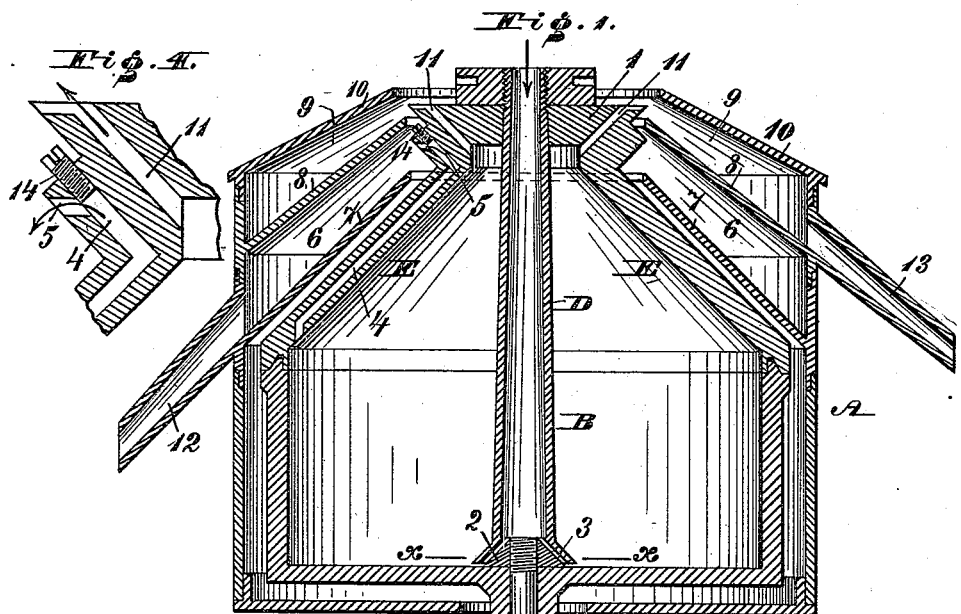
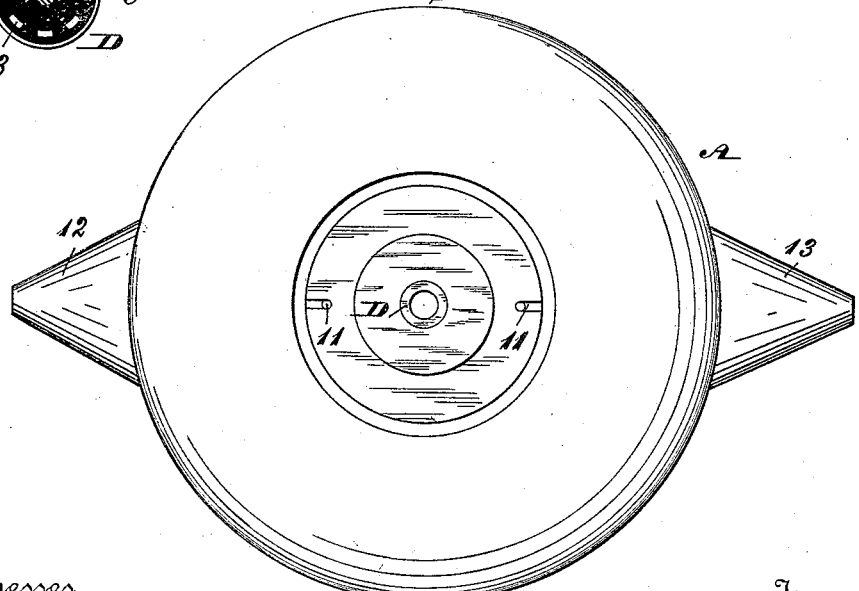
Witnesses
Theo Rollé
A. P. Jennings
Inventor
Henry F. Beimling
By his Attorneys

UNITED STATES PATENT OFFICE.

HENRY F. BEIMLING, OF PHILADELPHIA, PENNSYLVANIA, ASSIGNOR OF ONE-HALF TO JACOB K. SMITH, OF SAME PLACE.

CENTRIFUGAL LIQUID-SEPARATOR.

SPECIFICATION forming part of Letters Patent No. 427,390, dated May 6, 1890.

Application filed January 10, 1889. Serial No. 295,970. (No model.)

*To all whom it may concern:*

Be it known that I, HENRY F. BEIMLING, a citizen of the United States, residing in the city and county of Philadelphia, State of Pennsylvania, have invented a new and useful Improvement in Centrifugal Liquid-Separators, which improvement is fully set forth in the following specification and accompanying drawings.

My invention consists of an apparatus for separating liquids, such as cream from milk, the construction and operation of the same being hereinafter fully set forth.

Figure 1 represents a vertical section of a liquid-separator embodying my invention. Fig. 2 represents a top or plan view thereof. Fig. 3 represents a horizontal section on line $x\,x$, Fig. 1. Fig. 4 represents a section of a portion on an enlarged scale.

Similar letters and numerals of reference indicate corresponding parts in the several figures.

Referring to the drawings, A designates a stationary tank, within which is a rotatable tank B, the latter having connected with it a shaft C, whereby power may be communicated to said tank B. Rising from the center of the base of the tank B is the supply-tube D, which passes through the closed head of said tank and is secured thereto. The bottom of said tube D is flaring and encircles a conical-shaped piece 2, in which are ports 3, which form communication between the tube D and the interior of the tank B.

The upper portion E of the tank B is conical and joins the head or top 1, and in said portion are channels or ports 4, which communicate with the tank B and with a side channel 5, the latter being in the head 1, and opening into a chamber 6, which is formed by the conical partitions 7 and 8, which are connected with the tank A and located one above the other above the top E of the tank B. Above the wall 8 is a chamber 9, which is formed by the partition 8 and the top wall 10 of the tank A, it being noticed that the partitions 7 and 8 freely encircle the top portion of the tank B. In the head 1 are ports 11, which form communication between the tank B and chamber 9, and are above the ports 4 and nearer to the center of the tank than said ports 4. The chamber 6 is provided with a discharge-spout 12, and the chamber 9 with a discharge-spout 13. At the top of the port 5 is a screw-plug 14, which acts as a valve for opening and closing the discharge end of said port, and thus regulating the flow of the liquid from said port.

The operation hereinafter described with reference to the separation of cream from milk is as follows: The milk in normal condition is poured into the tube or conveyer D and discharged through the ports 3 into the tank B, and thus equally distributed in the latter. Power is communicated to said tank, whereby it rotates, and the milk is accordingly driven by centrifugal action. The cream rises and reaches the ports 11 and passes through the same, whereby it is discharged into the chamber 9, from whence it may be directed to a place of collection by the spout 13. The milk as separated or skimmed enters the port 4, whose inlet end is considerably below that of the port 11, and said milk is discharged into the chamber 6, from whence it may be directed to a place of collection by the spout 12.

The number of ports 4, 5, and 11 may be increased or decreased as desired.

Having thus described my invention, what I claim as new, and desire to secure by Letters Patent, is—

1. A liquid-separator consisting of a stationary outer tank, a rotatable inclosed tank, a supply-tube leading into said inclosed tank and having a flaring lower end, a conical block secured to the bottom of the said inner tank and inclosed by the flaring end of the supply-tube, and having ports therein leading from the supply-tube to the inner tank, said inner tank having ports leading therefrom and said outer tank having channels communicating with said ports, and discharge-pipes leading from channels, said parts being combined substantially as described.

2. A liquid-separator consisting of the stationary outer tank A, having the top wall 10 and inner walls 7 and 8, forming the channels 9 and 6, said channels having outlets on the periphery of the tank, an inner vessel with shaft passing through the bottom of the outer vessel or tank, the supply-tube D, with a flaring lower end, the block 2, having ports 3 and secured to the bottom of the inner vessel, said inner vessel having ports 4 and 5 leading into the channel 6, and ports 11 leading into the channel 9, the said ports 11 being above the ports 4 and 5 and nearer to the axis of the rotatable inner vessel than the same, said parts being combined substantially as described.

HENRY F. BEIMLING.

Witnesses:
 JOHN A. WIEDERSHEIM,
 A. P. JENNINGS.